Sept. 24, 1968 P. A. HERSCH 3,403,006
REINFORCED CAPILLARY STRUCTURE
Filed June 30, 1965
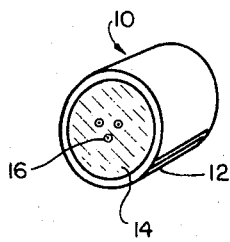
FIG. 1
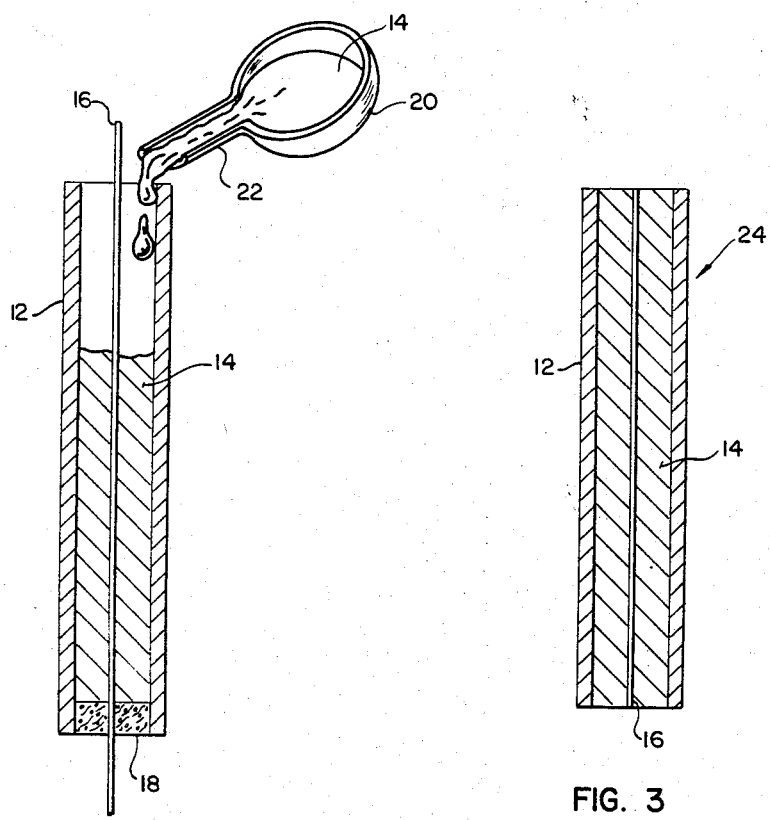
FIG. 2
FIG. 3
INVENTOR.
PAUL A. HERSCH
BY
ATTORNEY United States Patent Office 3,403,006
Patented Sept. 24, 1968

3,403,006
REINFORCED CAPILLARY STRUCTURE
Paul A. Hersch, Fullerton, Calif., assignor to Beckman Instruments, Inc., a corporation of California
Filed June 30, 1965, Ser. No. 468,267
7 Claims. (Cl. 23—292)

This invention relates to a reinforced capillary structure and, more particularly, to a very small bore, reinforced capillary structure and the method for making the same.

In calibrating sensitive gas analyzing equipment, in the manufacture of semiconductor materials, and for numerous other operations, very highly dilute gas mixtures are required. One method of forming such dilute mixtures is through a series of dilution steps, in each of which steps a known amount of an additive gas is introduced into a diluent gas and the mixture, in turn, is used as an additive gas mixed into further diluent gas. Several successive steps may be needed until the desired concentration is obtained. This method is extremely time-consuming and not entirely reliable. The dilution of our additive gas by a diluent gas may also be accomplished by introducing the additive gas at a very small yet reliably constant rate into the diluent gas through a reinforced capillary structure. An example of such a capillary structure is an elongated thick-walled glass capillary tube supported in a metal tube at opposite ends by suitable gaskets and having a section of reduced diameter formed by heating the wall of the capillary tube. This form of a reinforced capillary structure has the disadvantage that reasonably reproducible flow restrictions in the capillary tube are difficult to attain because of the difficulty of controlling the heat required to narrow the bore of the tube. In fact, too much heating may completely close off the bore in the tube. Another form of a reinforced capillary structure is disclosed in patent application Ser. No. 311,185, filed Sept. 24, 1963, assigned to the assignee of the present application. The reinforced capillary structure described in the aforementioned application is formed by positioning a minute glass capillary tube of high melting temperature within an opening of a glass wall having a lower melting temperature and heating the glass wall to collapse the wall onto the capillary tube. Although this capillary structure is useful for many applications, since it is a complete glass structure, it is not as rugged as desired for use in many gas analyzing applications, does not have as low a flow rate as is desired in some cases, and is limited to relatively high melting glass as the only suitable material for the capillary tube.

It is, therefore, the principal object of the present invention to provide a reinforced capillary structure which is extremely rugged and through which a very low, constant leak of fluid may be produced even under a high inlet pressure of the fluid.

Another object of the invention is to provide a reinforced capillary structure incorporating one or more very fragile capillary tubes which could not be reinforced by presently known techniques.

Still a further object of the invention is to provide a reinforced capillary structure in which the size of the bore therein is not appreciably affected by temperature changes.

A further object of the invention is to provide a simple and inexpensive method for forming a reinforced capillary structure.

According to the principal object of the present invention, a reinforced capillary structure is formed by positioning a capillary tube longitudinally in a tubular casing and by filling the casing with a metal having a melting point below the temperature at which the capillary tube and casing substantially deform and also having the property of expanding upon solidification. Consequently, after the casing is filled with the metal and allowed to cool, the metal solidifies and expands to seal against the walls of the casing and against the capillary tube embedded in the metal. The resulting structure is extremely rugged and, because the metal surrounding the capillary tube has a low melting point, very fine capillary tubes which would melt, deform, or deteriorate at relatively low temperatures can be incorporated in the structure of the present invention where they otherwise could not be utilized in conventional reinforced capillary structures. Since surh fine capillary tubes may be utilized in the structure of the present invention, very low, constant leaks of gases may be produced. The reinforced capillary structure of the invention can also be used for providing leaks of liquids if sufficient pressure is available to force the liquid through the minute capillary passage in the structure.

Other objects, aspects and advantages will become apparent from the following description taken in connection wth the accompanying drawing wherein:

FIG. 1 is a perspective view, greatly enlarged, of a relatively short section of the reinforced capillary structure of the present invention;

FIG. 2 illustrates the filling of the casing of the reinforced capillary structure with a melted metal with the casing shown in longitudinal section; and FIG. 3 is a longitudinal, sectional view of the finished reinforced capillary structure of the invention.

Referring now to the drawing in detail, there is illustrated in FIG. 1 a relatively short section 10 of the reinforced capillary structure of the invention. The structure comprises a casing 12 filled with a metal 14 having embedded therein at least one capillary tube 16, three of such tubes being shown in FIG. 1. Unlike in previous reinforced capillary structures, the capillary tube utilized in the present invention may be extremely thin, and therefore fragile, and also may be subject to deformation or deterioration at relatively low temperatures. Examples of suitable capillary tubes are glass or quartz tubes which are formed by heating a normal sized capillary tube and drawing it down to a very small size, for example, one having an inner diameter of about 0.001 millimeter. Also, plastic or metal capillary tubes of sufficiently small bore can be formed by known procedures. The invention also contemplates the use of hair or cotton fibers which, as is well-known, are hollow.

The metal 14 in which the capillary tubes 16 are embedded has a melting point below the temperature at which the capiallary tubes substantially deform, that is, at the temperature at which the capillary tubes would either melt, collapse, or become charred as would occur when they consist of organic materials, such as hair or cotton. Also, it is an essential feature of the invention that the metal 14 have the characteristic that it expands upon solidification from the liquid state. The purpose of using a metal having this characteristic will become more apparent below. Examples of such metals are those alloys available under the name "Wood's metal" or "Cerrobend," which are low-melting alloys containing bismuth and at least one or more of the metals, lead, tin and cadmium. The bismuth in these alloys is the metal primarily responsible for the characteristic that the alloys expand upon solidification. The aforementioned alloys have a low melting point, about 70° C., which is lower than the temperature at which any of the above-described capillary tubes 16 suffer any kind of substantial deformation which would cause the tubes to collapse or the walls of the tubes to deteriorate. The casing 12 which surrounds the metal body 14 is preferably made of copper, but may be formed of any other material which remains rigid at the temperature at which the metal 14 is fluid.

The manner in which the reinforced capillary structure of the invention is formed can best be understood by referring to FIG. 2 which shows the casing 12 disposed in a vertical position. The capillary tube 16, only one being shown in FIG. 2, is passed through a cork plug 18 which closes the lower end of the casing 12 and longitudinally aligns the capillary tube 16 within the casing. The plug 18 may be divided into two half sections for readily clamping the end of the capillary tube 16 prior to positioning the plug within the bottom of the casing 12. The metal 14 is melted in a suitable crucible 20 and then poured through a spout 22 into the casing 12 to completely fill the casing as shown in FIG. 3. Since the metal 14 has a lower melting point than the temperature at which either the capillary tube 16 or casing 12 substantially deform, the configuration of the capillary tube 16 and casing 12 is unchanged. However, because the metal 14 expands upon solidification, the capillary tube 16 becomes tightly sealed or embedded within the metal 14 and the metal 14 expands against the walls of the casing 12 to become firmly sealed thereto.

After solidification of the metal 14 in the casing 12, the plug 18 is removed and the ends of the capillary tube sawn off at the ends of the metal body 14, as shown in FIG. 3, to provide a finished reinforced capillary structure. The completed structure is extremely rugged, due to the expansion characteristics of the metal 14 as described previously. Also, extremely low flow rates of fluids may be produced through the structure since extremely minute-size capillaries such as hair or cotton fibers may be utilized. The elongated reinforced capillary structure 24 in FIG. 3 may be cut into a plurality of short sections, such as the section 10 shown in FIG. 1, to provide a series of uniform sized capillary structures having the same flow rate characteristics.

One reinforced capillary structure made in accordance with the present invention utilized a borosilicate ("Pyrex") glass capillary tube having an inner diameter of about 0.001 millimeter. Obviously, a plurality of such tubes could have been utilized if desired. In another structure, ordinary household thread which comprises a plurality of cotton fibers was used. In each case, the capillary tube or tubes were positioned longitudinally in a copper tube 5 inches long and having a ¼ inch interior diameter and "Cerrobend" was poured into the copper tube to fill the entire copper tube or casing in a manner as described above. In cross-section, the capillary tube or tubes in the reinforced capillary structures were invisible to the naked eye so that the ends of the reinforced capillary structures had the appearance of a solid rod.

It was found that when a gas was bled through the above-described reinforced capillary structures, the rate of flow was extremely low and constant. For example, when nitrogen was forced under a pressure as high as 100 lbs. per square inch through the above-described capillary structure incorporating a "Pyrex" capillary tube, only about 0.05 milliliter of nitrogen per minute bled from the exit end of the structure. This corresponds to about 30 grams of nitrogen per year at the same inlet pressure. It was also found that flow rate through the capillary structure was little dependent on temperature. For example, in a typical case, when the temperature of the reinforced capillary was increased from 23.5 to 30° C., the bleed rate of nitrogen gas therethrough changed from 0.207 to 0.197 milliliter of nitrogen per minute, a decrease of less than 1% per degree centigrade. Consequently, the reinforced capillary structure of the invention is extremely useful for making very highly dilute gas mixtures as is required in calibrating sensitive gas analyzing equipment and in some cases can also be used for producing liquid leaks.

It should be noted that a prime advantage of this invention is its ability to establish a constant, continuous, very small admixture to a diluent gas or gas stream at a rate that is almost independent of pressure fluctuations of the diluent. This is because the extremely high flow resistance that may be chosen for the capillary tubes in the structure also permits the use of very high driving pressures of fluid through the structure. The driving pressure $\Delta P = P_1 - P_0$ is the difference of the pressure $P_1$ of the source of the additive gas (i.e., the pressure of the gas at the inlet end of the capillary structure) and the pressure $P_0$ of the diluent gas (i.e., the pressure at the outlet end of the structure). Since $P_1$ is large in comparison with $P_0$, changes in $P_0$ affect $\Delta P$ only slightly. Thus, with an inlet pressure $P_1 = 100$ lb./sq. in. and an outlet pressure $P_0 = 14$ lb./sq. in. (i.e., atmospheric), a rise of $P_0$ by as much as 1 lb./sq. in. will cause a decrease of the bleed rate of less than 1%.

Although several embodiments of the invention have been disclosed herein for purposes of illustration, it will be understood that various changes can be made in the form, details, arrangements and proportions of the various parts in such embodiments and in the choice of the materials used therein without departing from the spirit and scope of the invention as defined by the appended claims.

What is claimed is:
1. A reinforced capillary structure comprising:
    at least one capillary tube embedded in a body of metal having two ends with the ends of said tube opening at the ends of said body;
    said metal having a melting point below the temperature at which said capillary tube substantially deforms; and
    said metal having the property of expanding upon solidification.
2. A reinforced capillary structure as set forth in claim 1 wherein a plurality of said capillary tubes in longitudinal alignment are embedded in said metal body with the ends of said tubes opening at the ends of said body.
3. A reinforced capillary structure as set forth in claim 1 including a hollow casing surrounding said metal body and sealed thereto except at the ends of said body; and
    said metal having a melting point below the temperature at which said casing substantially deforms.
4. A reinforced capillary structure as set forth in claim 1 wherein said metal is a bismuth alloy.
5. A reinforced capillary structure comprising:
    a hollow casing having two open ends;
    a body of metal filling said casing and sealed to the walls thereof;
    at least one capillary tube embedded in said metal body with the ends of said tube opening at the ends of said metal body in said casing;
    said metal having a melting point below the temperature at which said casing and said capillary tube substantially deform; and
    said metal having the property of expanding upon solidification.
6. The method of forming a reinforced capillary structure comprising the steps of:
    positioning at least one capillary tube lengthwise in a hollow casing having two open ends;
    closing one of the open ends of said casing to enable said casing to contain a melted metal;

melting a metal having a melting point below the temperature at which said casing and capillary tube substantially deform and having the property of expanding upon solidification;

filling said casing through the other of said open ends with said melted metal whereby said metal, upon solidification, seals to said capillary tube and the walls of said casing.

7. The method as set forth in claim 6 wherein said metal is a bismuth alloy.

References Cited

UNITED STATES PATENTS

| | | | |
|---|---|---|---|
| 2,241,086 | 5/1941 | Gould | 62—511 |
| 2,685,800 | 8/1954 | Natelson | 23—259 |
| 2,687,147 | 8/1954 | Feichter | 138—44 |
| 2,909,196 | 10/1959 | Jeffreys | 62—511 |

MORRIS O. WOLK, *Primary Examiner.*

E. A. KATZ, *Assistant Examiner.*